UNITED STATES PATENT OFFICE.

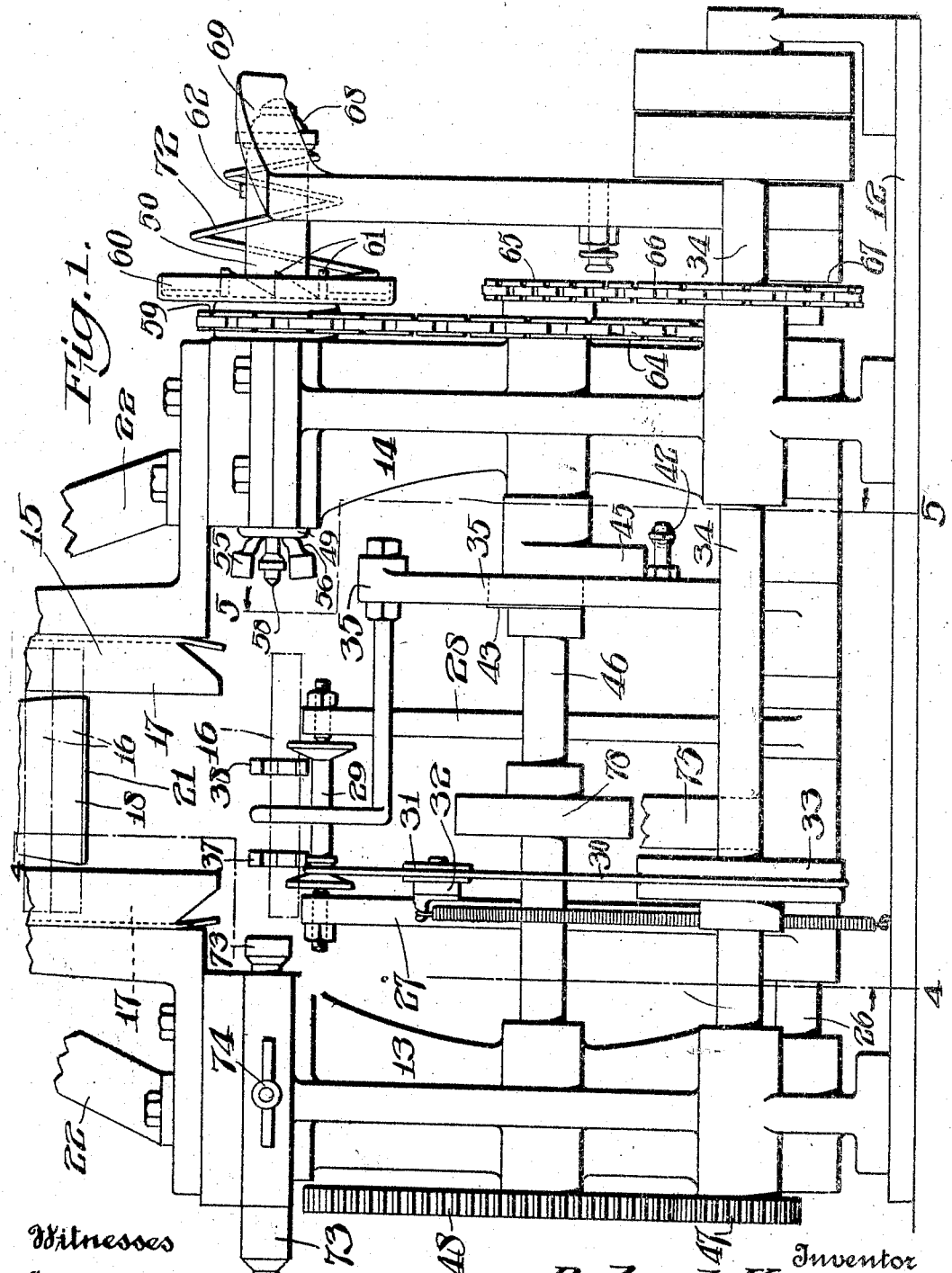

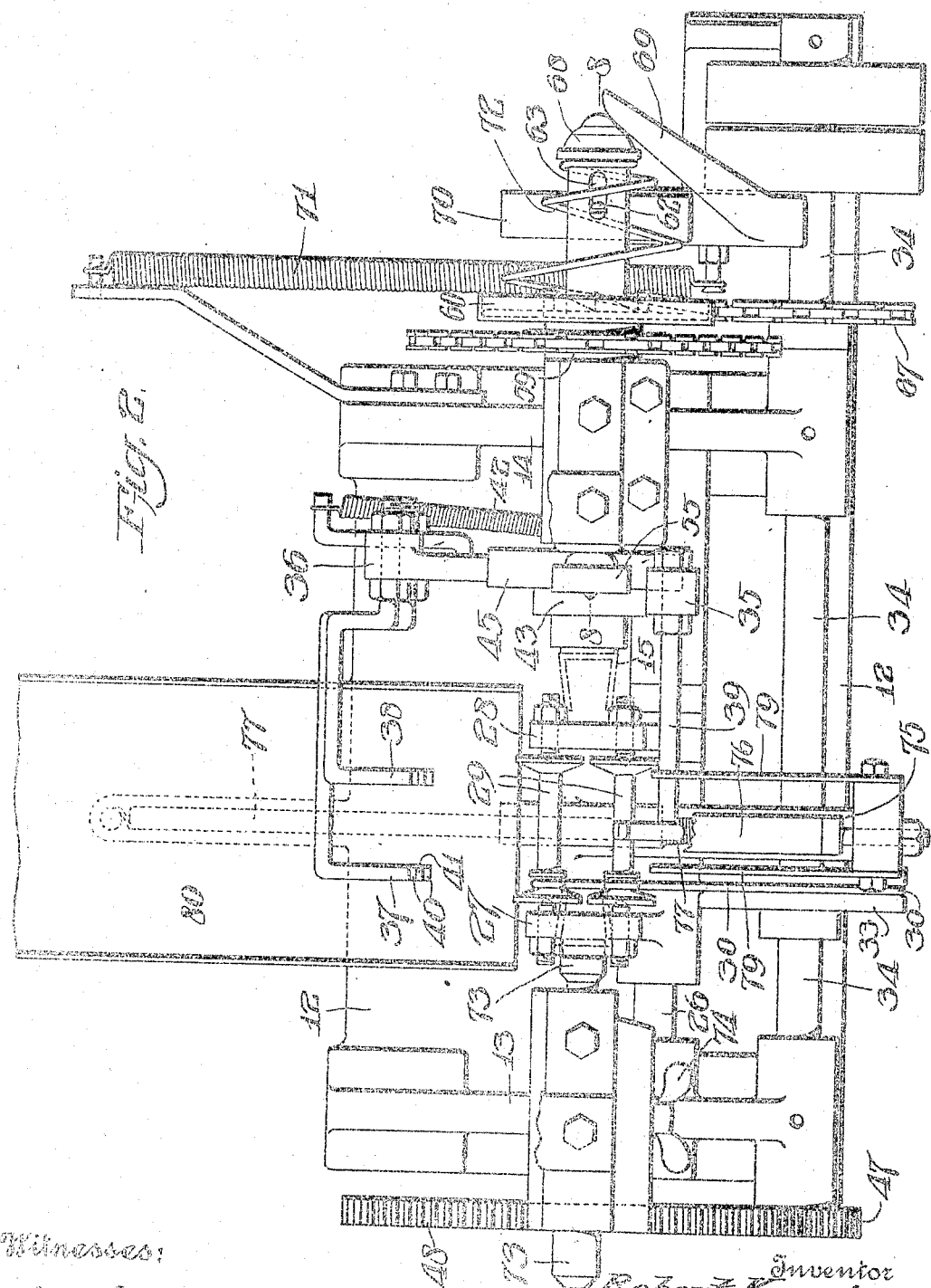

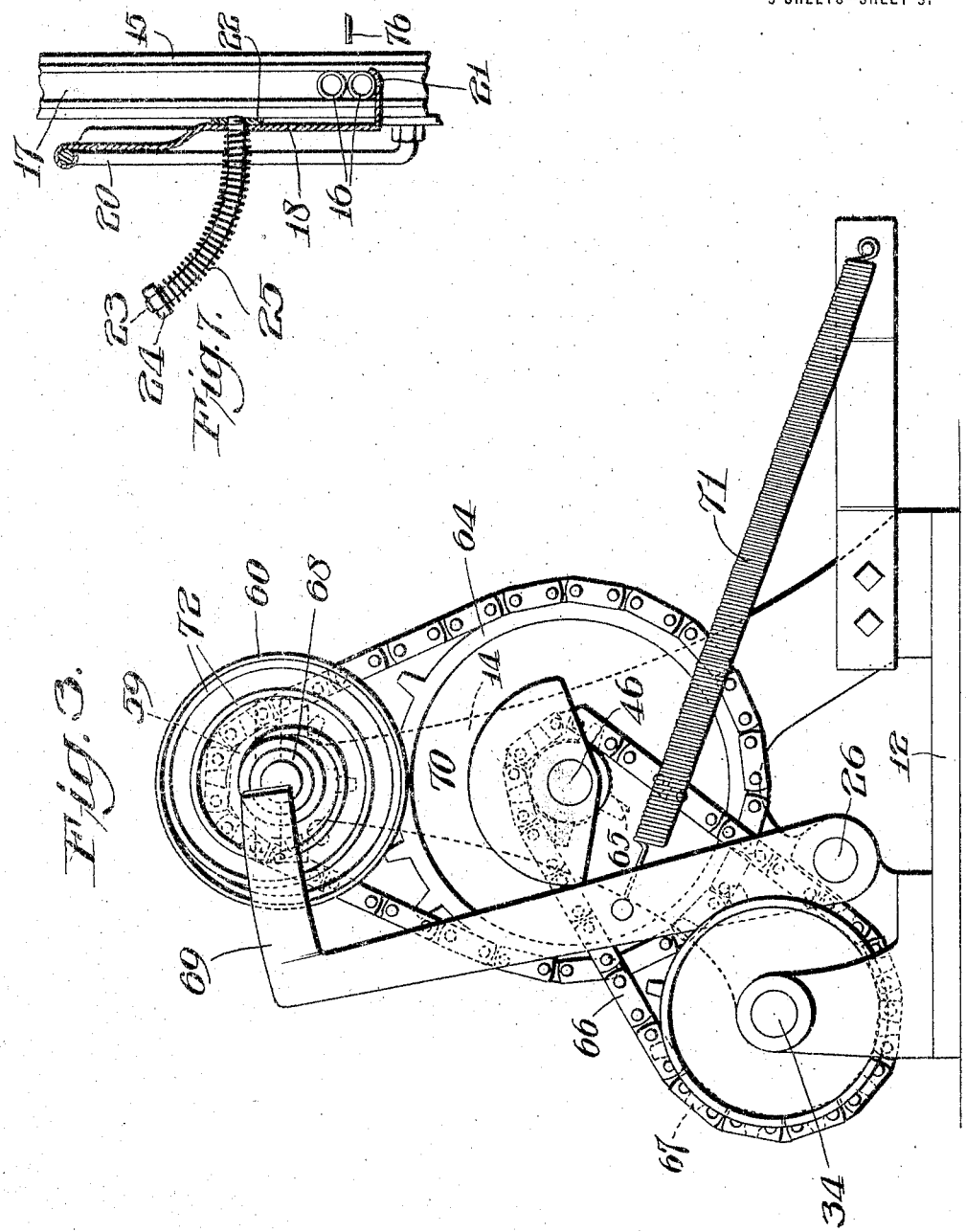

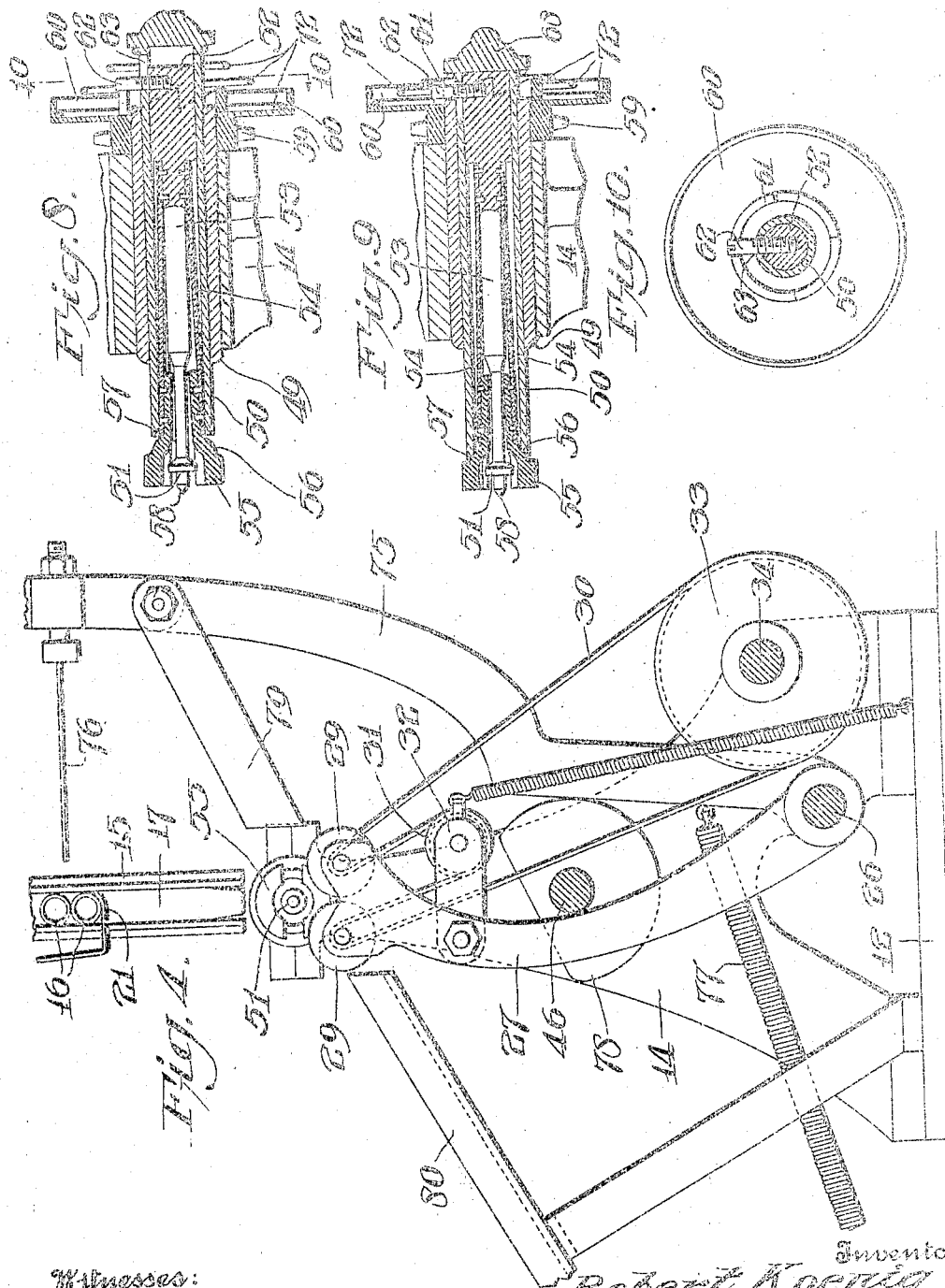

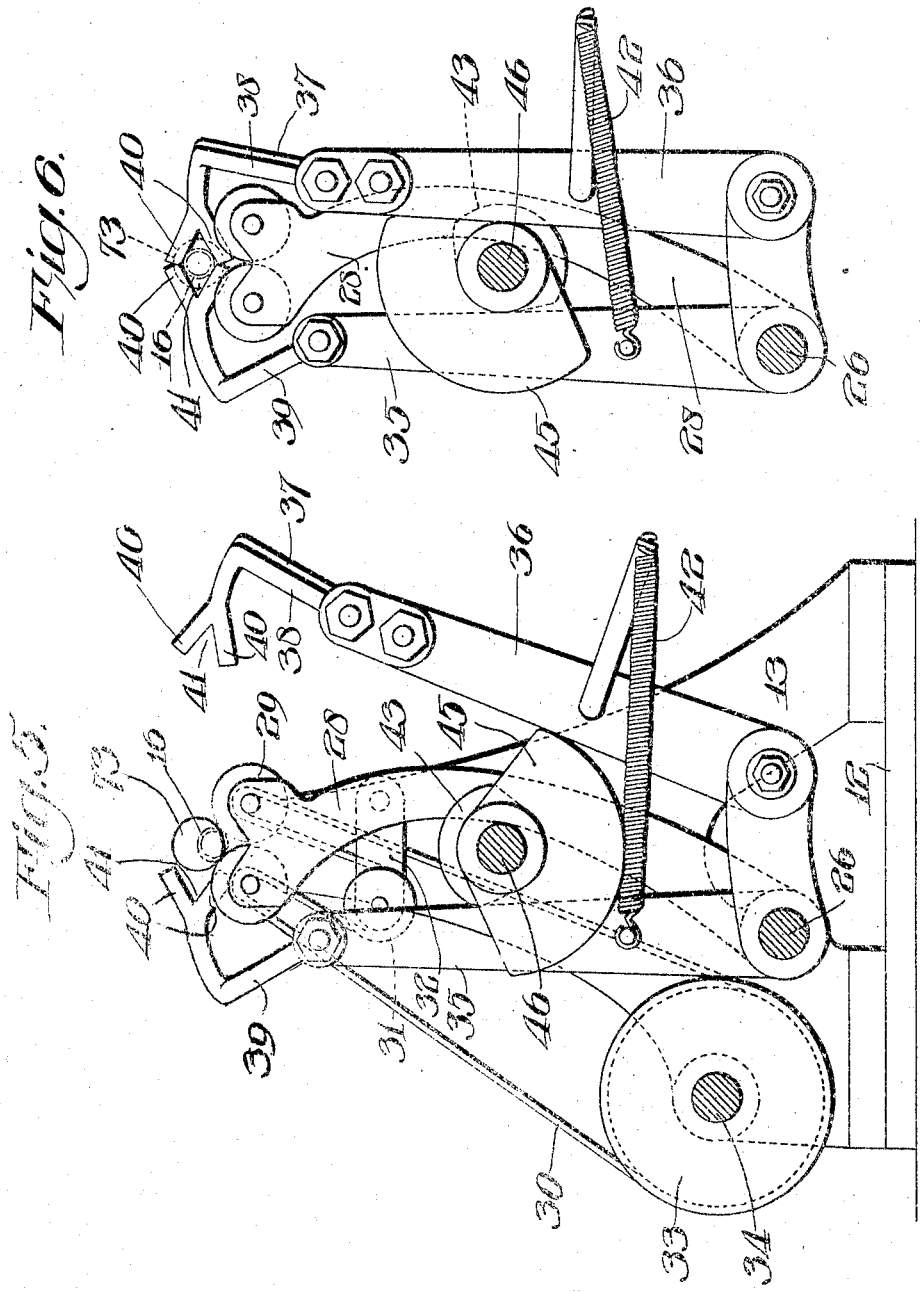

ROBERT KOENIG, OF CAMDEN, NEW JERSEY.

MACHINE FOR SHAPING TUBULAR GLASS ARTICLES.

1,304,691.  Specification of Letters Patent.  Patented May 27, 1919.

Application filed May 31, 1918. Serial No. 237,425.

*To all whom it may concern:*

Be it known that I, ROBERT KOENIG, a citizen of the United States, residing at Camden, in the county of Camden and State of New Jersey, have invented certain new and useful Improvements in Machines for Shaping Tubular Glass Articles, of which the following is a specification.

My improved machine is particularly adapted for shaping the ends of glass tubes and is of the same general type as the machine covered by my United States Patent, 982,212, January 17, 1911, with the exception that the machine of my present invention is capable of doing a greater variety of work.

One object of my invention is to provide a machine of the above mentioned type which is of simple construction and capable of imparting various shapes to glass tubes, bottles, or the like.

Another object is to so construct my improved machine that it will produce practically perfect work at a high rate of speed.

A further object is to produce a durable machine of the above described character which will require comparatively little power and which will turn out a large production of properly finished articles.

These objects, and other advantageous ends which will be described hereinafter, I attain in the following manner, reference being had to the accompanying drawings in which Figure 1 is a front elevation of my improved machine, Fig. 2 is a top plan view of Fig. 1, Fig. 3 is an elevation of the right hand end of my improved machine, Fig. 4 is a transverse sectional elevation taken on the line 4—4 of Fig. 1, Fig. 5 is a transverse sectional elevation taken on the line 5—5 of Fig. 1, Fig. 6 is a fragmentary transverse section of certain of the elements shown in Fig. 5, showing them moved into an operative position, Fig. 7 is a fragmentary elevation partly in section, showing tube holding and releasing means which is mounted at the top of the machine and as partially shown at the top of Figs. 1 and 4, Fig. 8 is a fragmentary sectional elevation of the shaping means which forms a part of my invention, taken on the line 8—8 of Fig. 2, and showing certain of the parts in different positions which they occupy during the operation of the machine, Fig. 9 is a view of similar nature to Fig. 8, showing certain of the parts in other positions which they occupy during the operation of the machine, and Fig. 10 is a transverse fragmentary section taken on the line 10—10 of Fig. 8.

Referring to the drawings, 12 represents a supporting base having two standards 13 and 14 secured thereto. These standards are spaced apart and at their tops form a support for a magazine 15 for containing glass articles to be shaped, in the present instance these articles being shown in the form of glass tubes 16. The magazine 15 includes two oppositely disposed channels 17 which are spaced apart.

A detent plate 18 is hinged at its top to a bracket 20 and at its bottom is provided with a lip 21 which is slightly curved upwardly, as clearly shown in Figs. 4 and 7. This lip 21 normally occupies a position below the bottom tube 16 in the magazine 15 and thereby normally supports all of the tubes in the magazine. The stationary bracket 20 includes a strip 22 in which is secured a curved rod 23 having a nut 24 on its screw threaded outer end. This rod 23 is curved in an arc concentric with the swing of the detent plate 18 and the detent plate 18 has a hole through which the rod freely passes.

A compression spring 25 is coiled around the rod 23 and one end of this spring engages the rear surface of the detent plate 18 while the other end of the spring abuts the nut 24. Thus the spring 25 normally holds the detent plate in the position shown in Figs. 4 and 7. However, it will be noted that the detent plate 18 can be swung rearwardly against the action of the spring 25 and this action occurs during the operation of the machine to permit the bottom tube to fall out of the magazine, the remaining tubes in the magazine being temporarily supported by auxiliary supporting means in a manner hereinafter described.

A stationary cylindrical shaft 26 has its opposite ends secured within the standards 13 and 14 and this shaft has two posts 27 and 28 secured thereto. The upper ends of these posts form a bearing for two flanged rollers 29. These rollers are positioned directly below the magazine 15 and are adapted to be constantly rotated in the same direction by a driving belt 30. This belt passes around both of the rollers and a take-up roller 31, said take-up roller being rotatable on one end of an arm 32, the other end of said arm being pivoted to the post 27.

The belt 30 is driven by a pulley 33 secured to a main driving shaft 34. The glass tubes 16 are adapted to be successively dropped upon the rollers 29 upon the magazine by the operation of releasing means above mentioned and hereinafter more specifically described. The rollers, being rotated by the pulley 33 and belt 30, will rotate the glass tubes, and during this rotating action, the end portion of the glass tube can be heated by any suitable means, such for example as the gas jets illustrated in my above mentioned United States Patent, 982,212, of January 17, 1911, and after the tube is properly heated it will be operated upon by mechanism now to be described.

Two arms 35 and 36, at their lower ends, are loosely mounted upon the stationary shaft 26. The upper end of the arm 36 has two fingers 37 and 38 adjustably secured thereto, the outer ends of said fingers being spaced apart and bifurcated or forked, as clearly shown in Figs. 2, 5, and 6. The other arm 35 has a single finger 39 adjustably secured thereto, said finger being oppositely disposed to the fingers 37 and 38 and at its outer end is also bifurcated or forked. The furcations or prongs 40 of each of the fingers 37, 38, and 39 extend at such angles as to provide substantially V-shape openings or recesses 41. The prongs 40 on the fingers are so located that when said fingers are moved toward each other the lower prongs of the fingers will engage under the tube supported by the rollers 29 and lift the tube above the top of and out of engagement with the rollers and the fingers will firmly hold the tube in this raised position.

By having the fingers 37 and 38 adapted to engage the tube from one side and the finger 39 adapted to engage the tube from the other side, and also by the arrangement of these fingers, as illustrated, so that the finger 39 moves in a plane passing between the planes of movement of the other two fingers, the tube will be held by what is known as a three point contact.

The tube-engaging movement of the fingers is accomplished in the present instance by a coiled spring 42 which serves to move the arms 35 and 36 from the position shown in Fig. 5 to the position shown in Fig. 6.

The timing of this movement is accomplished by two cams 43 and 45 which are secured to a secondary shaft 46 which is rotatably mounted in the standards 13 and 14 and is operatively connected to a fixed gear wheel 47 on the driving shaft 34 by a gear wheel 48. The cams 43 and 45 are of such shape and so positioned as to respectively engage the arms 35 and 36 so that the spring 42 cannot move the fingers into engagement with the tube until permitted to do so by the rotation of the cams 43 and 45.

After the tube 16 has been raised and while it is being held by the fingers 37, 38, and 39, it is operated upon by a rotatable shaping tool 51, the axis of which is in alinement with the axis of the glass tube when in its raised position and held by said fingers.

The standard 14 has a bushing 49 and a cylindrical sleeve 50 is adapted to slide longitudinally and rotate within said bushing. The shaping tool 51 includes a plunger 52 having a central stem 53 and two spring arms 54 connected thereto. The arms 54 are attached to the stem 53 and normally tend to spread apart due to the resilient action of the material comprising the arms.

The arms 54 at their outer end are provided with jaws 55 having tapered surfaces 56 adapted to coact with an inwardly beveled end surface 57 on the sleeve 50 so that if the sleeve 50 is moved into engagement with the tapered surfaces 56 of the jaws 55, it will cause said jaws to be contracted or moved toward each other.

The stem 53 of the tool 51 has a centering head 58 which is adapted, during the operation of the machine, to be projected into the ends of the glass tubes 16, in a manner hereinafter more completely described.

A sprocket wheel 59 is mounted so as to freely rotate on the bushing 49 and this sprocket wheel has a clutch collar 60 secured thereto and including annularly disposed clutch teeth 61. The plunger 52 has a pin 62 which projects outwardly through an elongated slot 63 in the sleeve 50. The slot 63 extends in the direction of the length of the sleeve 50 so that the pin 62 permits a relative sliding movement between the tool 51 and the sleeve 50, said sliding movement being sufficient to permit the beveled end 57 to engage the tapered surfaces 56 of the jaws 55 and thereby cause the latter to be moved toward each other, as above described.

The sprocket 59 is connected to another sprocket 64 which is freely rotatable on the secondary shaft 46. Another sprocket 65 is secured to the sprocket 64 and a chain 66 operatively connects the sprocket 65 with a sprocket 67 on the main driving shaft. The sprocket 65 being of small diameter compared to the sprocket 64, the sprocket 59 will be driven at a comparatively high speed.

The sleeve 50 is provided with a head 68 which is adapted to be engaged with a cam arm 69, the latter being freely mounted on the stationary shaft 26. The cam arm 69 is normally backed by a cam 70 secured to the secondary shaft 46 and a spring 71 serves to move the cam arm into engagement with the head 68 of the sleeve 50 when permitted to do so by said cam 70.

A coiled spring 72 normally holds the sleeve 50 outwardly in the position clearly shown in Figs. 1 and 2. However, when the cam 70 is rotated, the spring 71 will pull the cam arm 49 so that the latter will push the head 68 and the sleeve 50 inwardly and will consequently push the tool 51 toward the heated end of the glass tube 16 while being held by the fingers 37, 38, and 39.

The first part of the inward movement of the sleeve 50 will merely be a sliding movement until the pin 62 engages the clutch teeth 61 and since the clutch rotates constantly it will carry the pin 62 with it and consequently rotate both the sleeve 50 and the tool 51. As soon as the pin 62 abuts or engages the clutch teeth, it will be stopped as far as inward movement is concerned. However, the cam arm 69 continues to push against the head 68 and in so doing causes the sleeve 50 to engage the tapered surfaces 56 of the tool 51 and thereby moves the jaws 55 together.

This action takes place after the centering head 58 has entered the heated glass tube so that the jaws 55, when moved together, tend to compress the heated portion of the glass tube and since the tool is rotating the tube will be shaped in accordance with the shape of the interior of the jaws.

These jaws, it will be understood, can be varied in shape to cause different shapes to be formed upon the glass. It will also be understood that the slot 63 permits the longitudinal movement of the sleeve 50 independently of the movement of the tool so as to move the jaws together, as above described.

A stop bar 73 is slidably mounted in the top of the standard 13 and can be secured in various positions by a nut 74. The stop bar 73 is in alinement with the tool 51 and also in alinement with the glass tubes 16 while they are held by the fingers 37, 38, and 39 and forms a stop or abutment for the adjacent ends of the tubes while the tool 51 is operating upon them to shape the ends.

A lever 75 (see Fig. 4) is mounted so as to be free to swing upon the shaft 26 and carries a dividing plate 76 adapted to engage between the lowermost tube in the magazine 15 and the tube which is directly above it. This dividing plate also serves, when moved toward the last tubes by a spring 77, to engage the detent plate 18 and push it rearwardly so as to free the bottom tube and permit the latter to drop upon the rollers 29. The lever 75 is normally held in a forward and inoperative position by a cam 78 on the secondary shaft 46.

The lever 75 also supports an ejecting arm 79 which is so arranged as to push the tubes off of the rollers 29 after they have been shaped by the tool and the latter has moved away from the tube, permitting the tube to rest upon said rollers.

A chute 80 is supported in an inclined position so that the finished tube, after having been ejected by the arm 79, can roll into a receptacle (not illustrated) which can be mounted at the lower portion of the chute.

It will be noted that when the lever 75 is moved by the cam 78 that the dividing plate 76 will also be moved away from the tubes and permit them to drop downwardly upon the detent plate 18, the latter being moved, by the spring 25, into its normal position when permitted to do so by the retractive movement of the dividing plate 76.

In the operation of my improved machine, the dividing plate 76 divides the lowermost tube from the tube immediately above it in the magazine and then moves the detent plate 18 from under the lowermost tube. The latter then falls upon the rollers 29 which are constantly rotating and, therefore, the tube will receive a movement of rotation while resting upon these rollers. During this time the end portion of the tube nearest to the tool 51 will be heated completely throughout its circumference and by using burners such as illustrated in my former patent above mentioned, this heating action being extremely rapid. When the tube becomes sufficiently hot to soften the glass so that it can be worked by the tool, the fingers 37, 38, and 39 move into engagement with the tube and raise it out of engagement with the rollers and into direct alinement with the axis of the tool. The tool then moves, due to the action of the elements above described, toward the end of the tube until the jaws of the tube surround the softened and heated portion and the centering head passes within the tube.

The final inward movement of the tool then causes the jaws to move together while they are rotating and thus the heat-softened portion of the tube is annularly shaped, corresponding to the character of the tool jaws employed. While the tool is operating upon the tube the latter is firmly held against rotation by the fingers 37, 38, and 39 and after having completed its work the spring 72 will move the sleeve 50 of the tool outwardly to release the jaws from the glass tube and then will move the entire tool as a unit away from the glass tube, permitting the latter to drop again upon the rollers 29 when the fingers move apart.

The lever 75 then moves rearwardly so that the ejecting arm 79 pushes the finished tube from the rollers upon the chute 80 and the dividing plate 76 again performs its function of causing another tube to drop upon said rollers. It will be noted that the cam 78 is so designed, as clearly shown in Fig. 4, as to permit the member 75 and members 76 and 79 to quickly move inwardly and outwardly permitting the tubes to freely drop from the magazine.

While, as above stated, the fingers 37, 38, and 39 firmly hold the glass tube, nevertheless this holding is done by resilient means, namely, the spring 42 so that there is no harsh gripping action which would injure the tube or which would not permit it to be slightly moved in case of any irregularities in the positioning of any of the elements if such slight movement were necessary. However, these tube-engaging fingers are capable of raising the tube into practically perfect alinement with the tool.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A machine of the character described including means for supporting a glass article; a plurality of oppositely disposed members; means for moving said members so as to engage said article and lift it free from its support and said members then being operative to firmly hold said article; and shaping means for engagement with said article while thus held by the members, substantially as described.

2. A machine of the character described including means for rotating a glass article while being heated; means for gripping and stopping the article from rotating after it has been heated; and a rotatable tool movable into engagement with the heated portion of the article while the latter is being held by said second means, substantially as described.

3. A machine of the character described including means for supporting a glass article; a plurality of oppositely disposed fingers having forked ends providing recesses; means for moving said fingers so that said forked ends engage said article and lift it free of its support and then firmly hold said article within said recesses; and shaping means for engagement with said article while thus held by the fingers, substantially as described.

4. A machine of the character described including means for supporting a glass article; a plurality of oppositely disposed fingers having forked ends providing substantially V-shaped recesses; means for moving said fingers so that said forked ends engage said article and lift it free of its support said members then being operative to firmly hold said article within said recesses; and shaping means for engagement with said article while thus held by the fingers, substantially as described.

5. A machine of the character described including means for rotating a glass article while being heated; a plurality of oppositely disposed fingers having forked ends providing recesses; means for moving said fingers so that said forked ends engage said article and lift it from its rotating means and so that said article is held within said recesses; and shaping means for engagement with said article while thus held by the fingers, substantially as described.

6. A machine of the character described including means for rotatably supporting a glass article while being heated; means for raising said article free of said supporting means after it has become heated; and means for shaping said article after it has been raised, substantially as described.

7. A machine of the character described including means for rotatably supporting a glass article while being heated; oppositely disposed members having substantially V-shape recesses; means for moving said members in directions toward and from each other, said recesses being so located that their lower portions first engage said article and thereby raise it from its rotatable support during a portion of the movement of said members toward each other, the other portions of said recesses then being operative with the said first mentioned portions to hold said article; and means for shaping said article while thus held, substantially as described.

8. A machine of the character described including means for rotatably supporting a glass article while being heated; oppositely disposed members; resilient means for moving said members toward said article while on said support so as to lift said article from the support and then serve as holding means for said article; and cams operative as resisting and timing means for said members due to the action of said resilient means and also as positive actuating means for moving said members in a direction to release said article, substantially as described.

9. A machine of the character described including means for supporting a glass article; a tool for shaping said article, said tool comprising a rotatable and longitudinally movable sleeve having an elongated slot therein; a plunger positioned within said sleeve; a pin in said plunger, said pin extending outwardly through said slot to a position beyond the outer surface of the sleeve; spring arms secured to said plunger and positioned within said sleeve; jaws secured to the outer portions of said spring arms and normally held in a separated position due to the resiliency of said arms;

means for moving said sleeve, arms and their connected parts as a unit in a longitudinal direction; means for engagement with said pin for stopping the longitudinal movement of said jaws prior to the stopping of the longitudinal movement of the sleeve whereby the end of the sleeve is adapted to engage said jaws and move them together and into engagement with said article; and means for rotating said jaws when in said latter position, substantially as described.

10. A machine of the character described including means for supporting a glass article; a tool for shaping said article, said tool comprising a rotatable and longitudinally movable sleeve having an elongated slot therein; a plunger positioned within said sleeve; a pin in said plunger, said pin extending outwardly through said slot to a position beyond the outer surface of the sleeve; spring arms secured to said plunger and positioned within said sleeve; jaws secured to the outer portions of said spring arms and normally held in a separated position due to the resiliency of said arms; means for moving said sleeve, arms and their connected parts as a unit in a longitudinal direction; means for engagement with said pin for stopping the longitudinal movement of said jaws prior to the stopping of the longitudinal movement of the sleeve whereby the end of the sleeve is adapted to engage said jaws and move them together and into engagement with said article; and a rotatable clutch adapted to engage said pin and thereby cause the rotation of said sleeve, and the jaws and their connected parts, substantially as described.

11. A machine of the character described including means for supporting a glass article; a tool for shaping said article, said tool comprising a rotatable and longitudinally movable sleeve having an elongated slot therein; a plunger positioned within said sleeve; a pin in said plunger, said pin extending outwardly through said slot to a position beyond the outer surface of the sleeve; spring arms secured to said plunger and positioned within said sleeve; jaws secured to the outer portions of said spring arms and normally held in a separated position due to the resiliency of said arms; means for moving said sleeve, arms and their connected parts as a unit in a longitudinal direction; means for engagement with said pin for stopping the longitudinal movement of said jaws prior to the stopping of the longitudinal movement of the sleeve whereby the end of the sleeve is adapted to engage said jaws and move them together and into engagement with said article; and freely rotatable clutch means for moving said sleeve and jaws as a unit toward said glass article and to move said pin into engagement with said clutch, said latter means being operative to continue the longitudinal movement of said sleeve after said pin has been engaged by said clutch whereby said sleeve moves said jaws toward each other, substantially as described.

12. A machine of the character described including a magazine for holding articles in superimposed positions; a detent plate hinged at its top and positioned in the rear of said articles; lips on said detent plate adapted to support the lowermost of said articles; means for holding said detent plate in said position; and a dividing plate movable between said articles into engagement with said detent plate to push the latter out of position to release the lowermost of said articles and permit it to fall, said dividing plate serving as a temporary support for the remaining articles in the magazine during the falling action of said article, substantially as described.

In testimony whereof I have signed my name to this specification in the presence of two subscribing witnesses.

ROBERT KOENIG.

Witnesses:
MARY A. INGLAR,
CHAS. E. POTTS.